United States Patent
Orlick

(10) Patent No.: US 7,362,378 B2
(45) Date of Patent: Apr. 22, 2008

(54) METHOD OF EDGE BASED PIXEL LOCATION AND INTERPOLATION

(75) Inventor: Christopher J. Orlick, Newtown, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 525 days.

(21) Appl. No.: 11/032,451

(22) Filed: Jan. 10, 2005

(65) Prior Publication Data
US 2006/0152621 A1   Jul. 13, 2006

(51) Int. Cl.
*H04N 7/01* (2006.01)
(52) U.S. Cl. .................. 348/452; 348/448
(58) Field of Classification Search ........... 348/448, 348/452, 458, 701, 441; 382/269, 298–300
See application file for complete search history.

(56) References Cited

U.S. PATENT DOCUMENTS

| | | | |
|---|---|---|---|
| 4,731,648 A | 3/1988 | Bernard et al. | |
| 4,774,581 A | 9/1988 | Shiratsuchi | |
| 5,019,903 A * | 5/1991 | Dougall et al. | 348/448 |
| 5,051,826 A | 9/1991 | Ishii et al. | |
| 5,280,350 A | 1/1994 | DeHaan et al. | |
| 5,381,183 A | 1/1995 | Ishizuka et al. | |
| 5,532,751 A * | 7/1996 | Lui | 348/452 |
| 5,631,706 A | 5/1997 | Tsunashima | |
| 5,638,139 A | 6/1997 | Clatanoff et al. | |
| 5,786,862 A | 7/1998 | Kim et al. | |
| 5,793,435 A | 8/1998 | Ward et al. | |
| 5,796,437 A * | 8/1998 | Muraji et al. | 348/452 |
| 5,886,745 A | 3/1999 | Muraji et al. | |
| 5,936,676 A | 8/1999 | Ledinh et al. | |
| 5,943,099 A | 8/1999 | Kim | |
| 6,037,986 A | 3/2000 | Zhang et al. | |
| 6,055,018 A | 4/2000 | Swan | |
| 6,118,488 A | 9/2000 | Huang | |
| 6,181,382 B1 | 1/2001 | Kieu et al. | |
| 6,262,773 B1 | 7/2001 | Westerman | |
| 6,295,091 B1 | 9/2001 | Huang | |

(Continued)

FOREIGN PATENT DOCUMENTS

EP    0 344 843 A1    5/1989

(Continued)

OTHER PUBLICATIONS

International Search Report Nov. 2, 2007.

*Primary Examiner*—Victor R. Kostak
(74) *Attorney, Agent, or Firm*—RatnerPrestia

(57) ABSTRACT

A method for converting an interlaced scan image, having a plurality of pixels arranged in a matrix of rows and columns, to a progressive scan image processes interpolated picture elements (pixels) at target pixel positions between two successive rows of the interlaced scan image. The method determines if a pixel on a current row is an edge pixel and if the pixel is an edge pixel, it determines an approximate angle for the edge based on a difference between the column number of at least the edge pixels on the current row and the column number of at least one edge pixel on a previous row. The method uses the angle to determine which pixel on the current row and previous row correspond to the target pixel and interpolates the value of the target pixel from the corresponding pixels.

11 Claims, 6 Drawing Sheets

U.S. PATENT DOCUMENTS

| | | |
|---|---|---|
| 6,348,949 B1 | 2/2002 | McVeigh |
| 6,421,090 B1 | 7/2002 | Jiang et al. |
| 6,545,719 B1 | 4/2003 | Topper |
| 6,577,345 B1 | 6/2003 | Lim et al. |
| 6,614,484 B1 * | 9/2003 | Lim et al. .................... 348/448 |
| 6,731,342 B2 | 5/2004 | Shin et al. |
| 6,810,156 B1 | 10/2004 | Itoh |
| 7,154,556 B1 * | 12/2006 | Wang et al. ................. 348/452 |
| 7,218,354 B2 * | 5/2007 | Tanaka ....................... 348/448 |
| 7,242,819 B2 * | 7/2007 | Jiang .......................... 382/300 |
| 7,245,326 B2 * | 7/2007 | Orlick ........................ 348/448 |
| 2001/0008425 A1 | 7/2001 | Shin et al. |
| 2003/0076447 A1 | 4/2003 | Wang et al. |

FOREIGN PATENT DOCUMENTS

| | | |
|---|---|---|
| EP | 0 550 231 | 12/1992 |
| EP | 0 984 624 A2 | 3/2000 |
| EP | 1 313 312 | 5/2003 |
| EP | 1 679 886 | 7/2006 |
| JP | 02-058988 | 2/1990 |
| JP | 2001-298714 | 10/2001 |

* cited by examiner

METHOD OF EDGE BASED PIXEL LOCATION AND INTERPOLATION

FIELD OF THE INVENTION

The present invention relates generally to a method for converting interlace scan video signals to progressive scan video signals and, in particular, to a method of interpolating a value for a picture element (pixel) of an interstitial row of pixels, lying on or near to an edge between visually distinct regions of an interlace scan video image.

BACKGROUND OF THE INVENTION

The image on the television screen consists of pixels, arranged horizontally in rows, generally offset vertically by one pixel position from one another. Each pixel is assigned three values, which indicate the respective intensities of the red, green, and blue components of the pixel. A video image is generated by sequentially displaying the rows of pixels as horizontal lines of the image.

Existing analog broadcast standards such as NTSC, PAL and SECAM use two video fields to generate a single video frame. Each field includes one-half of the horizontal lines that make up the image frame. One field includes all of the odd numbered lines of the frame and the other field includes all of the even numbered lines. Interlaced images exhibit distorting artifacts such as image flickering that degrade the resulting frame image. One way to eliminate these artifacts is to convert the interlace-scanned fields into progressive-scan frames. In a progressive-scan frame, both the odd and even image lines are displayed sequentially as a single image.

Interlace-scan to progressive-scan conversion systems are gaining importance as more television viewers purchase high-definition television monitors that can display progressive-scan signals. Both broadcast facilities and consumers may want to have interlace-scan to progressive-scan conversion capability in order to avoid the distorting artifacts of interlace-scan images.

One way to generate progressive-scan frames from interlace-scan fields is to interpolate interstitial lines in each field. Thus, the lines of the odd field are used to interpolate even-numbered lines and the lines of the even field are used to interpolate odd-numbered lines.

Each pixel of the interpolated line (or the "interpolated pixel") is calculated based on the values of proximate pixels in adjacent interlace-scan lines. The simplest method of generating the interpolated pixel is simply duplicating the pixel from the corresponding position in the previously received scan line. For pixels which lie on a diagonal edge, this could result in "jaggies" (a line which appears to be jagged or stair-stepped, rather than smooth). For pixels which are not on an edge, such duplication could result in pixels that do not correspond to the image being displayed, resulting in a poor display to the viewer. This method also reduces the vertical resolution of the image compared to an interlace-scan image and may result in areas of the image flickering at a 30 Hz rate.

Another simple method is to set the value of the interpolated pixel as being the average of two vertically adjacent pixels. However, for a pixel on the edge of two visually distinct regions, such an averaging could result in a pixel that matches neither adjacent pixel. For example, the value generated for an interpolated pixel between a blue pixel and green pixel may be cyan, which would not result in the image desired to be presented to the viewer.

FIG. 5 shows an image 100 on a television screen, consisting of two visually distinct regions 102 and 104. The border 106 between the two visually distinct regions is referred to herein as an edge. An image on a television screen may consist of more than two visually distinct regions, and any one or more visually distinct regions may not be entirely contained within the television screen, as is illustrated.

Visually distinct regions are defined by the edge between them, in contrast to a more gradual change, such as a shadow (which may have gradations of gray and black) or light on a wall (which may have gradations of color). In generating an interpolated pixel which is to be on an edge, it is desirable to consider the visual smoothness of the edge being displayed. If the value of the pixel being interpolated were based solely on the pixels proximate in the received scan lines, the calculated value may be a blend of the values of the two visually distinct regions, rather than a distinctive edge separating the two regions. The result could be an edge without sufficient clarity to distinguish between the two regions, a line that is not visually smooth, or a pixel that has the correct value for an edge but is displayed at the wrong pixel location. Therefore, pixels of an interpolated line which lie on an edge between two visually distinct regions desirably take into consideration not only the values of the pixels proximate in the received scan lines, but also the edge itself, to ensure as visually pleasing an edge as possible.

Prior interlace-scan to progressive-scan conversion systems have recognized this problem and have processed pixels on edges differently than pixels in the regions that are separated by the edges. One such system is described in U.S. Pat. No. 5,886,745 entitled PROGRESSIVE SCANNING CONVERSION APPARATUS issued Mar. 23, 1999, to Muraji et. al., the contents of which are incorporated herein by reference for its teaching on interlace-scan to progressive-scan conversion systems.

The above-referenced patent to Muraji et al. calculates the angle of the edge in a local region based on pixel gradients in the region. This angle is then used to identify appropriate pixels to be used to generate interpolated pixels. While such calculations yield very precise results, there is a cost in speed, memory usage, and overhead.

In addition, existing gradient operators do not specifically address problems inherent with interlaced video signals in which adjacent lines from the image frame are missing, nor do they address the issue of noise in the input signal.

SUMMARY OF THE INVENTION

To meet this and other needs, and in view of its purposes, the present invention is embodied in a method for converting an interlaced scan image, having a plurality of pixels arranged in a matrix of rows and columns, to a progressive scan image by processing interpolated picture elements (pixels) at target pixel positions between two successive rows of the interlaced scan image. The method comprises the steps of determining if a pixel on a current row is an edge pixel and if the pixel is an edge pixel, determining an approximate angle for the edge based on a difference between the column number of at least the edge pixels on the current row and the column number of at least one edge pixel on a previous row. The method uses the angle to determine which pixels on the current row and previous row correspond to the target pixel and interpolates the value of the target pixel from the corresponding pixels.

Alternatively, the present invention is embodied in a method that includes the following steps. The method determines first and second gradient intensity value of pixels in respective first and second directions in a predetermined region about the target pixel position and determines magnitude values for the first and second gradient intensity value. Next, the method determines if at least one of the first magnitude value and the second magnitude value exceeds a predetermined threshold to define the pixel as an edge pixel. If the pixel is an edge pixel, the first and second gradient intensity values are compared to determine an approximate angle for the edge. If the approximate angle of the edge is determined to be less than about forty-five degrees, an approximate angle for the edge is determined based on a difference between the column number of at least the edge pixel on a current row and the column number of at least one edge pixel on a previous row. Next, the method uses the angle to determine which pixels on the current row and previous row correspond to the target pixel and interpolates the value of the target pixel from the corresponding pixels. The last step is to interpolate a value for the target pixel at a position along the edge from the corresponding edge pixels.

The present invention is also embodied in an apparatus for generating an interpolated picture element (pixel) at a target pixel position between two successive rows of an interlaced scan image which forms a matrix of columns and rows, the apparatus includes an edge detector, a processor which determines an approximate angle for the edge based on the difference between the column number of the edge pixel on a current row and the column number of a corresponding edge pixel on a previous row. The apparatus also includes an interpolator that combines values of pixels in the interlaced scan image adjacent to the target pixel and along the determined angle to generate the interpolated pixel.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Included in the drawings are the following figures.

DETAILED DESCRIPTION OF THE INVENTION

The present invention includes an edge detector which is disclosed in U.S. Published Patent Application No. US-2003-0098925-A1 and is incorporated here by reference for its teachings on edge detectors. The edge detector includes a method for determining if a pixel is an edge pixel by determining gradient intensity values in two directions and determining if either of the gradient intensities values is greater than a predetermined threshold. Briefly, a horizontal edge detector and a vertical edge detector are used to determine a numeric value called an edge strength. Each detector uses two finite impulse response filters, to correlate the pixels to respective expected edge profiles. The output signals provided by the filters indicate the respective edge strength values. An edge is present if either or both of the respective edge strength values exceed a predetermined threshold.

The present invention relates to a method and apparatus for converting an interlaced scan image, having a plurality of pixels arranged in a matrix of rows and columns, to a progressive scan image by generating interpolated picture elements (pixels) at target pixel positions between two successive rows of the interlaced scan image.

Figure 3:
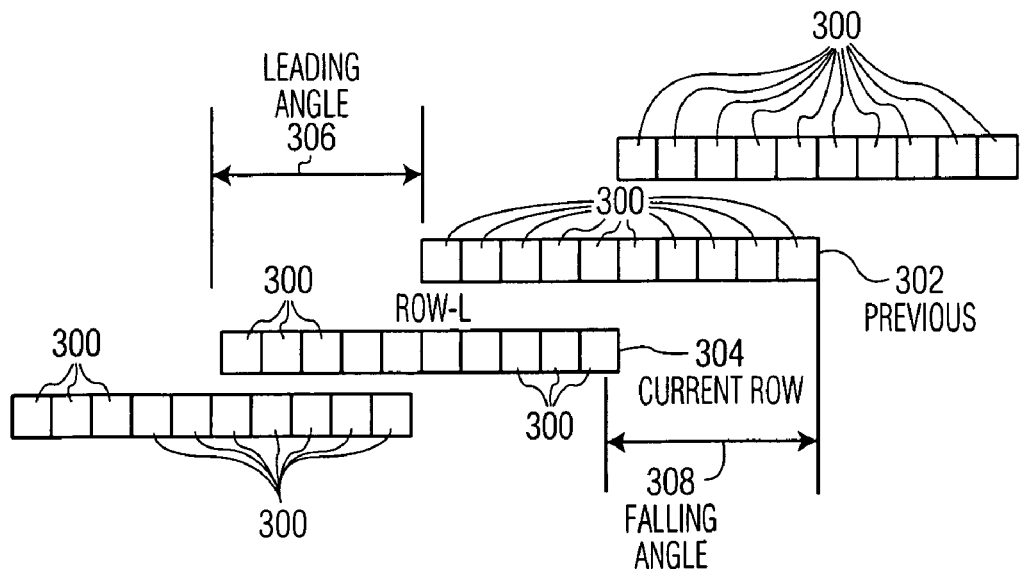
FIG. 3 is a screen image diagram useful for describing an exemplary embodiment of the present invention.

FIG. 3 is a screen image diagram that shows a possible configuration of edge pixels 300. For the sake of simplicity only the edge pixels are shown. In an exemplary embodiment of the invention the edge detector 104 (shown in FIG. 1) detects if a pixel is an edge pixel. As shown in FIG. 3, the previous row 302 and current row 304 include multiple edge pixels. A leading angle 306 and a trailing angle 308 can be determined from the rows of edge pixels on the previous row 302 and current row 304. The leading angle 306 or the trailing angle 308 can be used to determine a final angle for the edge, as disclosed below.

Figure 2:
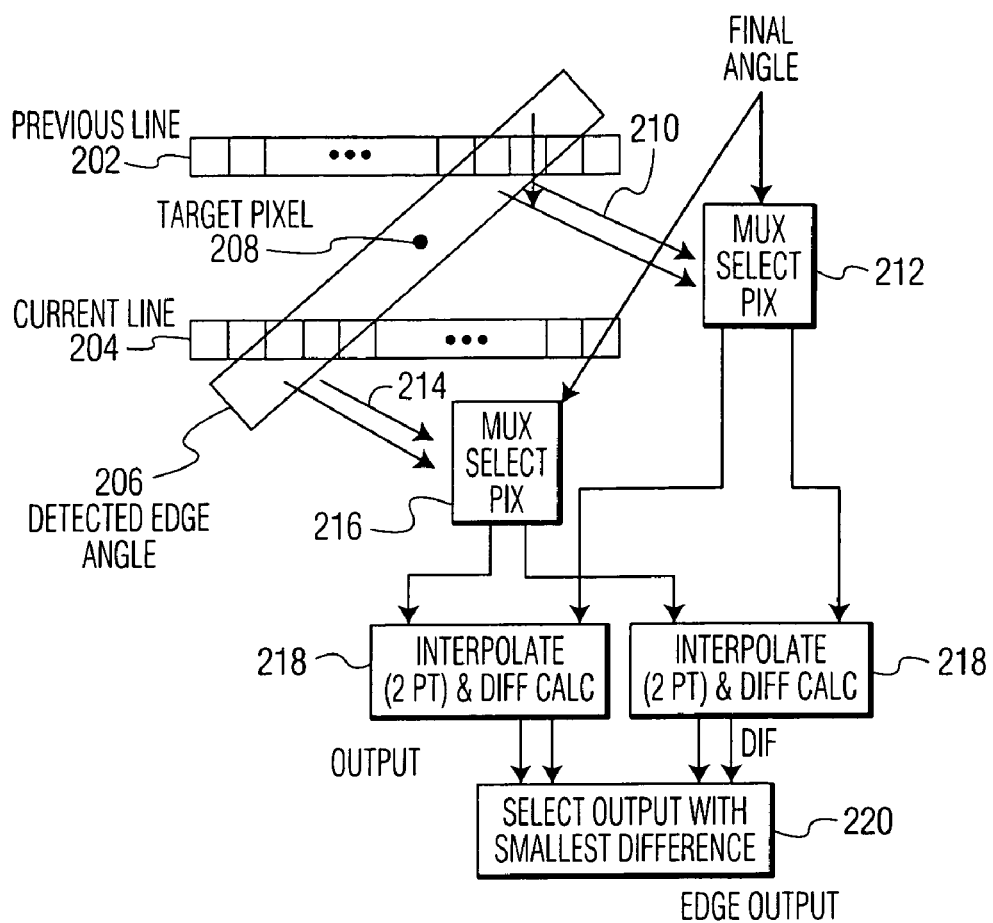
FIG. 2 is a functional block diagram useful for describing an exemplary embodiment of the present invention.

FIG. 2 shows an exemplary embodiment of the invention. As shown in FIG. 2, the shaded area 206 represents a detected edge angle based on multiple edge pixels from the previous line 202 and multiple edge pixels from the current line 204. Once a target pixel 208 has been determined, the system determines if the target pixel may be an edge pixel and determines an approximate edge angle 206. Next, multiple pixels from the previous line 202 are routed by first multiplexers 212 and multiple edge pixels from the current line 204 are routed by second multiplexers 216 to multiple interpolators 218. From the final angle described above, pixels from the previous line 202 are selected and corresponding pixels from the current line 204 are selected. These pixels are selected as having different angles that define lines through the target pixel. A value for the target pixel is interpolated by interpolator 218 which also calculates respective absolute difference values of the corresponding selected pixels on the previous line 202 and on the current line 204. The interpolated pixel value corresponding to the smallest absolute difference values is chosen as the target pixel value by the comparator 220.

Figure 1:
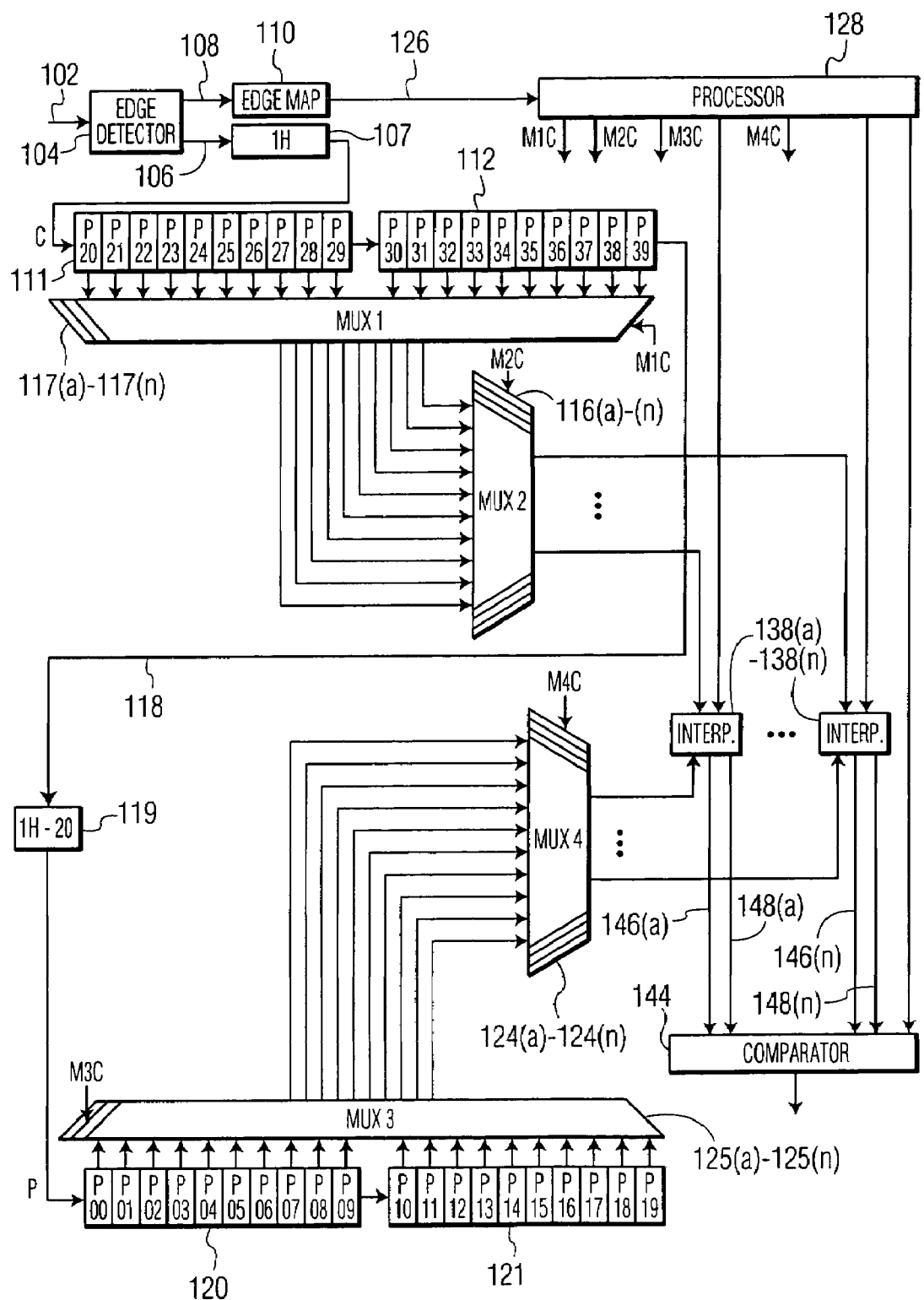
FIG. 1 is a block diagram of an exemplary embodiment of the invention.

In an alternative exemplary embodiment of the invention shown in FIG. 1, pixels on a current row are applied to an edge detector 104 as an input signal 102. The edge detector 104 determines if a pixel is an edge pixel and generates the edge map. In the exemplary edge map 110, pixels that are edge pixels have a value of logic-1 and pixels that are not edge pixels have a value of logic-0. The edge map holds more than two lines of pixels, which include a current row, a previous row and at least a portion of a next row. The next row of pixels is the line currently being processed by the edge map. As each new row of pixels is processed, the current row of pixels becomes the previous row of pixels and the next row of pixels becomes the current row of pixels.

The edge map entries for the current row of pixels and the previous row of pixels are examined by the processor 128 to determine if the previous and current lines include an edge and the approximate angle of the edge. The processor 128 determines the approximate angle for the edge pixels on the current and previous rows based on a difference between the column number of the edge pixel on the current row and the column number of a corresponding edge pixel on the previous row.

The pixels 106 provided by the edge detector 104 are sequentially applied and stored into the row of registers 111 and the row of registers 112 with a delay of one horizontal line 107. The pixels provided by the delay 107 are pixels from the current line of the image. The pixels are shifted through the row of registers 111 and the row of registers 112 and are provided to at least one multiplexer from the first set of multiplexers 117(*a*)-117(*n*). The pixels 118 are also shifted through a row of registers 120 and a row of registers 121 with a delay of one horizontal line minus twenty pixels 119. These pixels are pixels from the previous line of the image. The pixels stored in the row of registers 120 and the row of registers 121 are provided to at least one multiplexer from a third set of multiplexers 125(*a*)-125(*n*). It is contemplated that the rows of registers 111, 112, 120 and 121 may include any number of registers.

Figure 6A:
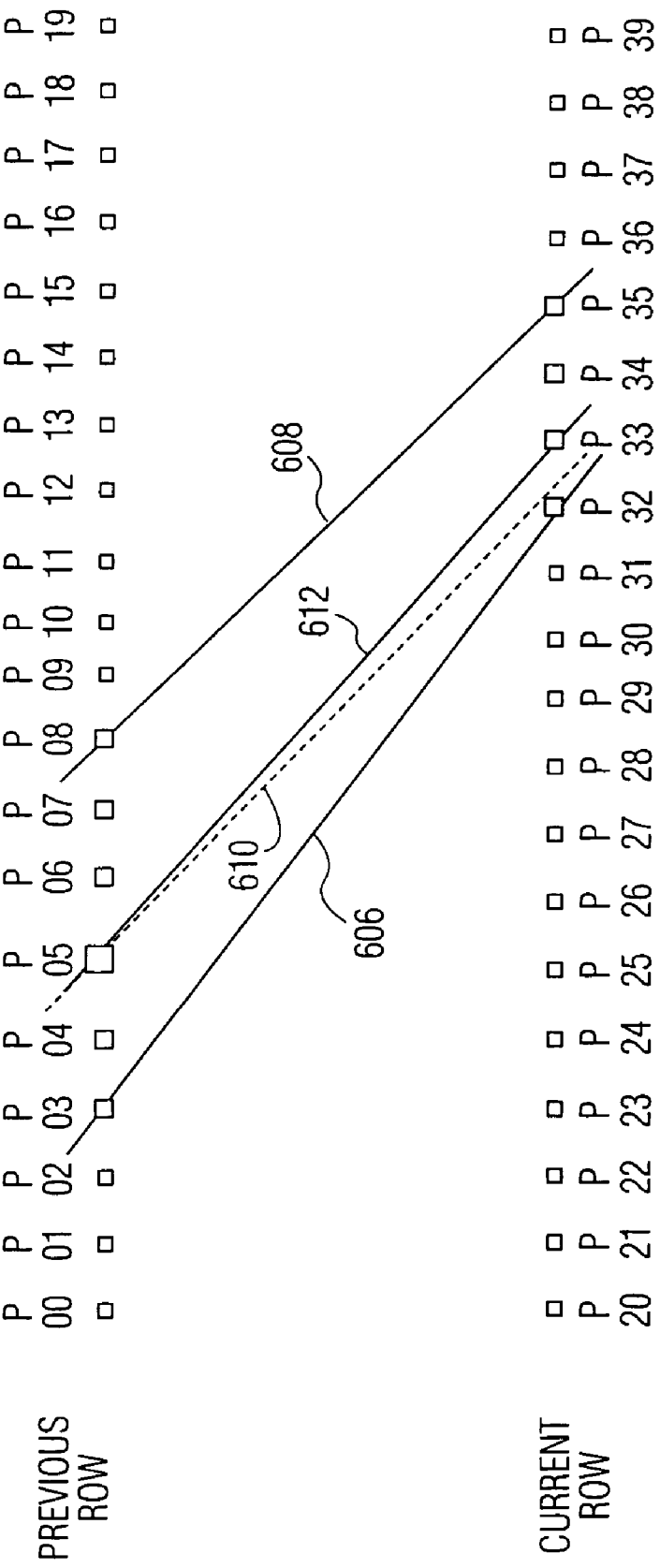
FIG. 6(a) is a pixel diagram useful for describing an exemplary embodiment of the invention.
Figure 6B:
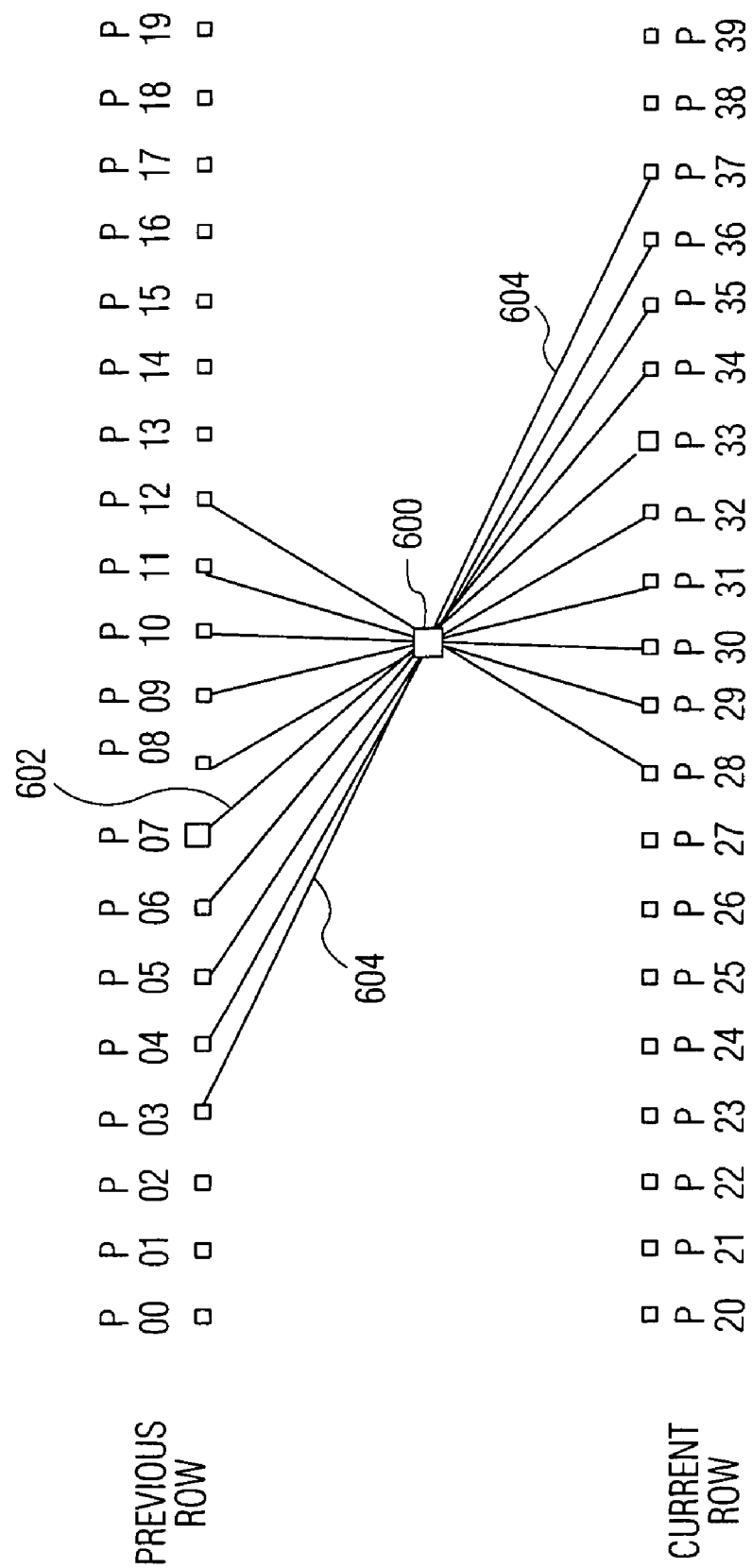
FIG. 6(b) is a pixel diagram useful for describing an exemplary embodiment of the invention.

The processor 128 determines if a pixel is an edge pixel and the angle of the edge by examining the edge map 110. If it is determined that at least one pixel from the row of registers 111 is an edge pixel and row of registers 112 is an edge pixel, the processor 128 determines an approximate angle for the edge and a corresponding edge pixel from the row of registers 120 and row of registers 121 by averaging leading and falling edge angles. FIG. 6(*a*), is a pixel diagram useful for describing this aspect of the exemplary embodiment of the invention.

Referring to FIG. 6(*a*), pixels P20-P29 and pixels P30-P39 are pixels stored into the row of registers 111 and the row of registers 112 respectively and represent the pixels from the current line of the image. Pixels P00-P09 and pixels P10-P19 are pixels stored into the row of registers 120 and the row of registers 121 respectively and represent the pixels from the previous line of the image. The processor 128, which generates a value for the target pixel 600, examines the edge map 110 for the previous row and determines pixel P05 to be an edge pixel on the previous row. Processor 128 then examines the edge map for the current row to determine an angle for the edge by examining the edge map to determine the first and last edge pixels in the segment on the current line and the previous line to determine a leading edge angle 606 and a trailing edge angle 608. These angles are averaged to determine an approximate angle for the edge that includes the target pixel 600. In FIG. 6(*a*), the average of the leading and trailing edge angles results in a preliminary approximated edge angle 610 which falls between pixels P32 and P33 on the current line. The preliminary angle 610 may be rounded up or down to the nearest pixel on the previous line to approximate the edge angle. For example, in FIG. 6(*a*), the preliminary approximated edge angle 610 is rounded up to intersect with corresponding pixel P33 to approximate the edge angle 612.

FIG. 6(*a*) is an example of determining the approximated edge angle 612. The approximated edge angle 612 in FIG. 6(*a*) is a negative angle. For approximated negative edge angles, the processor 128 signals at least one multiplexer from the first set of multiplexers 117(*a*)-117(*n*) to select pixels P30-P39 to be provided to at least one multiplexer from a second set of multiplexers 116(*a*)-116(*n*). The processor 128 also signals at least one multiplexer from the third set of multiplexers 125(*a*)-125(*n*) to select pixels P0-P9 to be provided to at least one multiplexer from a fourth set of multiplexers 124(*a*)-124(*n*). For approximated positive edge angles, the processor 128 signals at least one multiplexer from the first set of multiplexers 117(*a*)-117(*n*) to select pixels P20-P29 to be provided to at least one multiplexer from the second set of multiplexers 116(*a*)-116(*n*). The processor 128 also signals at least one multiplexer from the third set of multiplexers 125(*a*)-125(*n*) to select pixels P10-P19 to be provided to at least one multiplexer from the fourth set of multiplexers 124(*a*)-124(*n*).

The processor 128 uses this approximated edge angle to select the corresponding pixels to be interpolated to approximate a value for the target pixel. In addition, the processor 128 selects pixels immediately adjacent to the corresponding pixels to be interpolated to approximate a value for the target pixel. FIG. 6(*b*) is a pixel diagram useful for describing this aspect of the exemplary embodiment of the invention.

In FIG. 6(*b*), edge angle 602 has been approximated to intersect with pixel P07 on the previous line and the corresponding pixel P33 on the current line. From this edge pixel combination, the processor determines a value for the target pixel 600. In the exemplary method the processor 128 examines the edge map 110 to determine nine pixels immediately adjacent to the edge pixel P07 and determines pixels P03-P06 and P08-P12 to be pixels immediately adjacent to the edge pixel P07. In the exemplary method, the processor 128 causes the multiplexers 116(*a*)-116(*n*) and 124(*a*)-124(*n*) to select at least one corresponding pixel from the previous line and at least one adjacent pixel from the current line by selecting the adjacent edge pixels which have an edge angle that intersects the two adjacent pixels and intersects the target pixel 600. For example, in FIG. 6, the processor 128 determines pixels P28-P32 and pixels P34-P37 to be nine pixels immediately adjacent to corresponding pixel P33 on the current line. Pixel P33 may or may not be an edge pixel. For pixel P03, the processor selects P37 as the corresponding pixel because the angle 604 intersects pixel P03, pixel P37 and the target pixel 600. The other adjacent pixels P28-P32 and P34-P36 from the current line are selected as corresponding pixels to P04-P06 and P08-P12 on the previous line respectively.

The processor 128 controls the second set of multiplexers 116(*a*)-116(*n*) to select a plurality of values from the current line to be applied to a set of interpolators 138(*a*)-138(*n*). These pixels are selected from the group of actual pixels also applied to the second set of multiplexers 116(*a*)-116(*n*) from the first set of multiplexers 117(*a*)-117(*n*) and the row of registers 111 and 112. The processor 128 also controls a fourth set multiplexers 124(*a*)-124(*n*) to select a plurality of values from the previous line to be applied to the set of interpolators 138(*a*)-138(*n*). These pixels are selected from a group of actual pixels also applied to the fourth set of multiplexers 124(*a*)-124(*n*) from the third set of multiplexers 125(*a*)-125(*n*) and the row of registers 120 and 121.

The processor 128 controls at least one multiplexer from the second set of multiplexers 116(*a*)-116(*n*) to pass the pixels from the row of registers 111 and 112 by way of the first set of multiplexers 117(*a*)-117(*n*) to an interpolator from a set of interpolators 138(*a*)-138(*n*). The processor 128 controls at least one multiplexer from a fourth set of multiplexers 124(*a*)-124(*n*) to pass the pixels from the row of registers 120 and 121 by way of the third set of multiplexers 125(a)-125(n) to an interpolator from the set of interpolators 138(a)-138(n). Each pixel combination is passed through its own pair of multiplexers to be interpolated by at least one respective interpolator from the set of interpolators 138(a)-138(n).

As each pixel combination is passed to an interpolator, the processor 128 controls the interpolator to generate an average value and an absolute difference value. First, the interpolator adds the values of the two pixels and divides by two to generate an average value. Second, the interpolator subtracts the value of one pixel from the other pixel to determine a difference value, calculates the absolute value of the difference value, and generates the absolute difference value between the two pixels. It is contemplated that any method of interpolation may be used. The average values are provided to a comparator 144 via signals 146(a)-146(n). The absolute difference values are provided to the comparator 144 via signals 148(a)-148(n).

After the interpolators generate the average values and absolute difference values for each pixel combination, the processor 128 controls the comparator 144 to compare the respective absolute difference values for each pixel combination and to choose the average pixel value corresponding to the smallest absolute difference value as the value for the target pixel 600.

If the processor 128 determines that the group of pixels from either row of registers 112 or row of registers 120 does not include an edge pixel then the processor 128 controls at least one interpolator from the set of interpolators 138(a)-138(n) to interpolate a value for the target pixel 600 by generating the average value from the pixel above the target pixel position and the pixel below the target pixel position.

Figure 4:
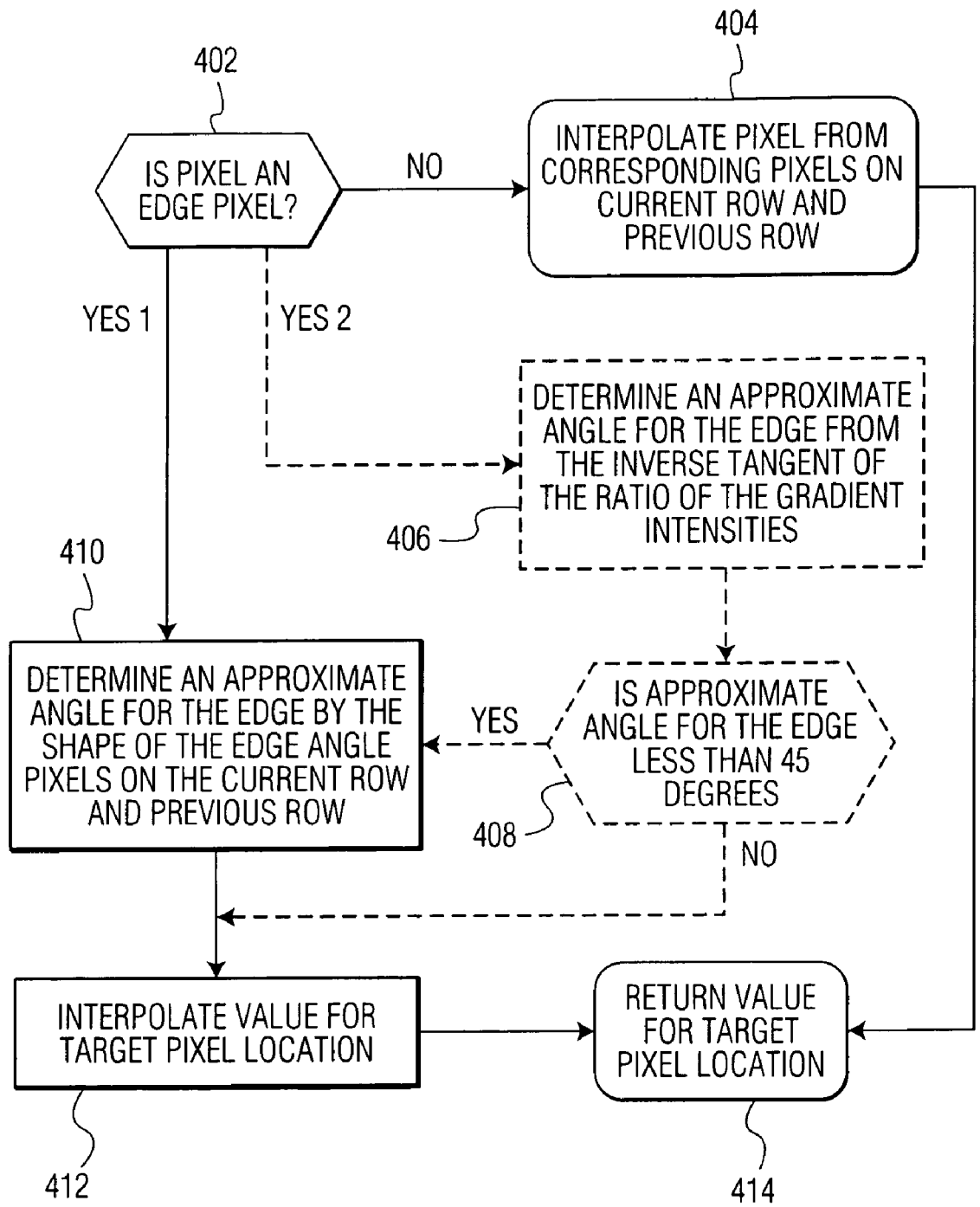
FIG. 4 is a flow diagram of an exemplary embodiment of the present invention.
Figure 5:
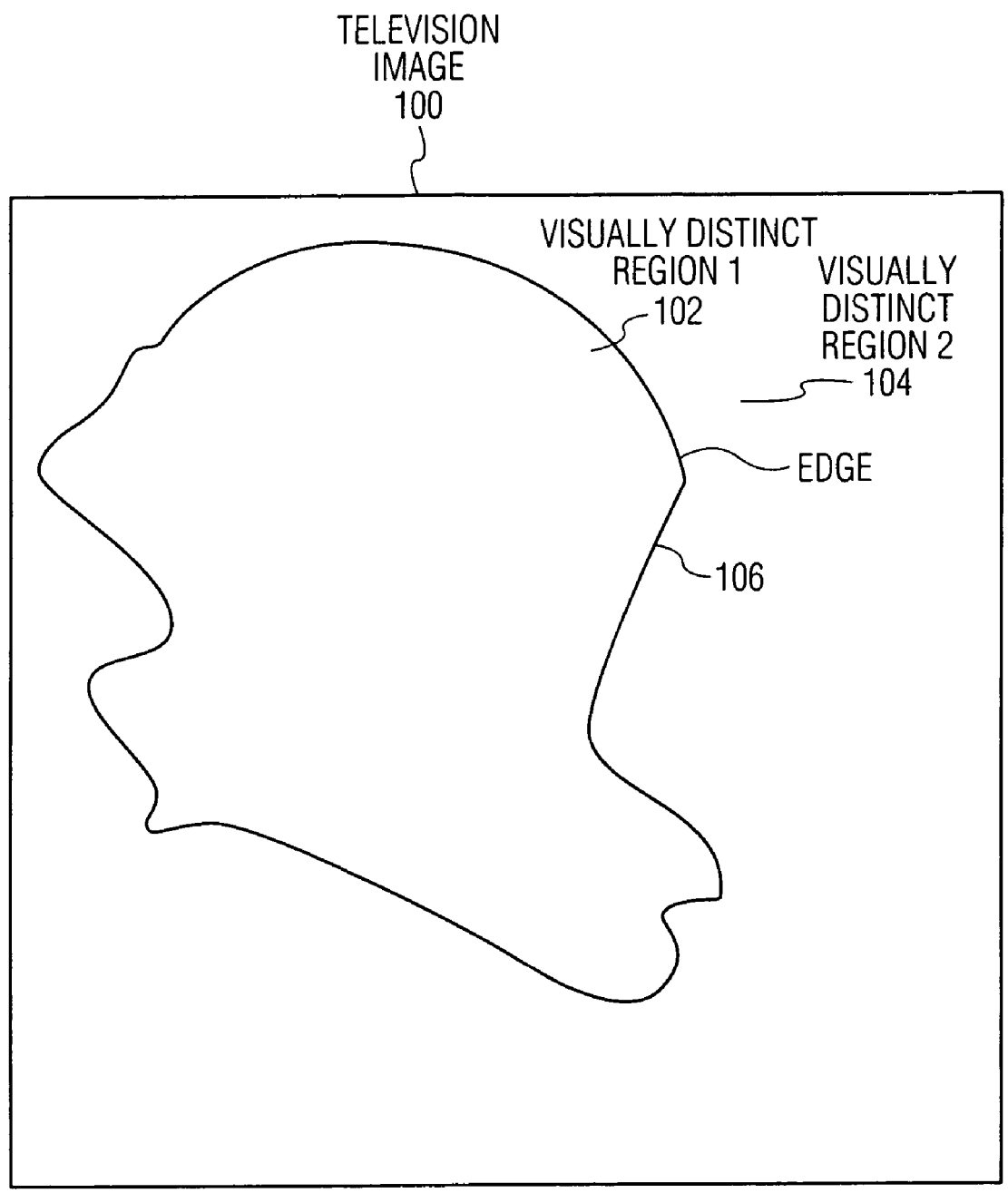
FIG. 5 is a screen image on a television screen useful for describing an exemplary embodiment of the present invention.

The present invention can also be embodied entirely in software. FIG. 4 is a flow chart diagram illustrating an exemplary embodiment according to the present invention. At step 402, the computer generates an edge map, which may, for example, be generated according to the algorithm described above. From the edge map, the computer determines if a pixel is an edge pixel At step 410, if it has been determined that a pixel is an edge pixel, the edge map is used to approximate an angle for the edge based on a difference between the column numbers of the leading and trailing edge pixels on a current row and the column numbers of corresponding leading and trailing edge pixels on a previous row.

At step 412 combinations of edge pixels from the current row and previous row are used to interpolate an approximate value for the target pixel. Specifically, the combination of the edge pixel on the current row with the corresponding pixel on the previous row, as determined by the approximate angle, is used to interpolate a value for the target pixel. Average values and absolute difference values are calculated for each of the pixel combinations. As described above, an average value is calculated by adding the values of the two pixels and dividing by two. An absolute difference value is calculated by subtracting the value of one pixel from the other pixel to determine a difference value and calculating the absolute value of the difference value.

The value for the target pixel is calculated by comparing the respective absolute difference values for each pixel combination, choosing the pixel combination with the smallest absolute difference value as the corresponding pixels used to interpolate the value for the target pixel and calculating the average value of the pixel combination with the smallest absolute difference value as the value for the target pixel. The value for the target pixel is returned at step 414.

Another exemplary embodiment of the invention is shown in phantom in FIG. 4. If it is determined that a pixel is an edge pixel, the first and second gradient intensity values are compared to determine an approximate angle for the edge at step 406. The method for determining an approximate angle for the edge, which is disclosed in Publication No. US-2003-0098925-A1 and is incorporated here by reference for its teachings on this method includes calculating an approximate angle for the edge from the inverse tangent of the ratios of the first and second gradient intensity values. The relative edge strength values of the horizontal and vertical edges are used to determine the angle of the edge at the target pixel position. The magnitudes of the edge strength values are expressed as bit strings. Selected bits, starting with the most significant bit position, are located for each strength value. The positions of these bits approximate the logarithm of their respective values. A predetermined number of less significant bit positions are examined to determine the angle of the edge. An approximate angle of the ratio of the two edge strength values is calculated by subtracting the logarithmic values, calculating the antilog of the subtracted logarithmic values, which is equivalent to the tangent of the edge angle, and calculating the inverse tangent.

As the approximate angle for the edge becomes more shallow, the method for determining an approximate angle for the edge which is disclosed in Publication No. US-2003-0098925-A1 and described above, becomes increasingly unreliable. At step 408 if it is determined that an approximate angle for the edge is less than forty-five degrees, an approximate angle for the edge is determined by using the edge map to approximate an angle for the edge based on a difference between the column numbers of leading and trailing edge pixels on a current row and the column numbers of corresponding leading and trailing edge pixels on a previous row as described above at step 410. If an approximate angle for the edge is calculated to be less than forty-five degrees, combinations of edge pixels from the current row and previous row are used to interpolate an approximate value for the target pixel as described above at step 412. Otherwise, the method described in the above-referenced patent application is used. The respective value for the target pixel is returned at step 414.

For pixels that are not edge pixels, target pixel values are interpolated by calculating a difference value from the pixel above the target pixel position and the pixel below the target pixel position at step 404. The respective value for the target pixel is returned at step 414.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for converting an interlaced scan image, having a plurality of pixels arranged in a matrix of rows and columns, each column having a respective column number, to a progressive scan image by processing an interpolated picture element (pixel) at a target pixel position between respective current and previous rows of the interlaced scan image, the method comprising the steps of;
    determining if at least one of the current row or the previous row includes at least one edge pixel; and
    if the current row or the previous row includes at least one edge pixel;

selecting multiple pixels along the current and previous rows including respective beginning edge pixels and end edge pixels;

determining an approximate angle for the edge based on (a) a leading edge angle determined by a difference between the column numbers of the beginning edge pixels and (b) a trailing edge angle determined by the column numbers of the end edge pixels; and determining respective pixels on the current and previous rows which correspond to the target pixel based on the determined edge angle; and interpolating a value for the target pixel at a position along the edge from the corresponding pixels.

2. A method according to claim 1, wherein the step of determining if a pixel is an edge pixel further includes;

determining a first gradient intensity value of pixels in a first direction in a predetermined region about the target pixel position and a first magnitude value for the determined first gradient intensity value;

determining a second gradient intensity value of pixels in a second direction in a predetermined region about the target pixel position, the second direction being different from the first direction, and a second magnitude value for the determined second gradient intensity value; and determining if at least one of the first magnitude value and the second magnitude value exceeds a predetermined threshold to define the pixel as an edge pixel.

3. A method according to claim 1, wherein if the target pixel is an edge pixel:

identifying pixels immediately adjacent to the corresponding pixel on the current row and pixels immediately adjacent to the corresponding edge pixel on the previous row; and selecting at least one of the adjacent pixels from the previous row corresponding to at least one of the adjacent pixels from the current row by selecting the adjacent pixels which have an angle that intersects the two selected adjacent pixels and the target pixel to form at least one corresponding pixel combination; and interpolating a value for the target pixel at a position along the edge from the at least one corresponding pixel combination.

4. A method according to claim 3 in which the step of interpolating a value for the target pixel further includes calculating respective absolute difference values of the corresponding pixels and choosing the interpolated value of corresponding pixels with the smallest absolute difference values as the target pixel value.

5. A method for converting an interlaced scan image, having a plurality of pixels arranged in a matrix of rows and columns, each column having a respective column number, to a progressive scan image by processing an interpolated picture element (pixel) at a target pixel position between two successive rows of the interlaced scan image, the method comprising the steps of;

determining a first gradient intensity value of pixels in a first direction in a predetermined region about the target pixel position and a first magnitude value for the determined first gradient intensity value;

determining a second gradient intensity value of pixels in a second direction in a predetermined region about the target pixel position, the second direction being different from the first direction, and a second magnitude value for the determined second gradient intensity value;

determining if at least one of the first magnitude value and the second magnitude value exceeds a predetermined threshold to define the pixel as an edge pixel;

if the pixel is an edge pixel, comparing the first and second gradient intensity values to determine an approximate angle for the edge; and if the approximate angle of the edge is determined to be less than forty-five degrees:

selecting multiple pixels along the current and previous rows including respective beginning edge pixels and end edge pixels;

determining an approximate angle for the edge based on (a) a leading edge angle determined by a difference between the column numbers of the beginning edge pixels and (b) a trailing edge angle determined by the column numbers of the end edge pixels;

determining respective pixels on the current and previous rows which correspond to the target pixel based on the determined edge angle; and interpolating a value for the target pixel at a position along the edge from the corresponding pixels.

6. A method according to claim 5 wherein if the approximate angle for the edge is determined to be less than forty-five degrees, the method further includes the steps of:

identifying pixels immediately adjacent to the corresponding pixel on the current row and pixels immediately adjacent to the corresponding pixel on the previous row; and selecting at least one of the adjacent pixels from the previous row corresponding to at least one of the adjacent pixels from the current row by selecting the adjacent pixels which have an angle that intersects the two selected adjacent pixels and the target pixel to form at least one corresponding pixel combination; and interpolating a value for the target pixel at a position along the edge from the at least one corresponding pixel combination.

7. A method according to claim 5 wherein the step of determining an approximate angle for the edge if the approximate angle for the edge is determined to be less than forty-five degrees further includes;

averaging the approximate angles defined by the beginning edge pixels and end edge pixels to obtain the approximate angle for the edge.

8. A method according to claim 6 in which the step of interpolating a value for the target pixel further includes calculating respective absolute difference values of the corresponding pixels and choosing the interpolated value of corresponding pixels with the smallest absolute difference values as the target pixel value.

9. Apparatus for generating an interpolated picture element (pixel) at a target pixel position between two successive rows of an interlaced scan image which forms a matrix of columns and rows, each column having a respective column number, the apparatus comprising;

an edge detector;

a processor that determines an approximate angle for the edge based on the difference between the column number of at least one edge pixel on a current row and the column number of at least one edge pixel on a previous row; and an interpolator that combines values of pixels in the interlaced scan image adjacent to the target pixel and lying along the determined angle to generate the interpolated pixel wherein the processor that determines the approximate angle for the edge includes circuitry which determines an approximate angle along a beginning edge and an approximate angle along an end edge from multiple pixels along a row containing a pixel corresponding to the beginning edge and a pixel corresponding to the end edge and averages approximate angles of the beginning and end edges to obtain the approximate angle.

10. An apparatus according to claim 9 wherein the edge detector further includes;
- a first correlation filter configured to filter a row of the interlaced scan image in a region about the target pixel position to generate a first gradient intensity value having a first magnitude value and a first sense value;
- a second correlation filter configured to filter successive rows of the interlaced scan image in a region about the target pixel position to generate a second gradient intensity value having a second magnitude value and a second sense value, wherein the second gradient intensity value is with respect to a different angle than the first gradient intensity value; and
- a comparator which determines if at least one of the first magnitude value and the second magnitude value exceeds a predetermined threshold to define the pixel as being an edge pixel.

11. An apparatus according to claim 9 wherein the interpolator that combines values of pixels in the interlaced scan further includes circuitry for calculating respective absolute difference values of the selected pixels and choosing the pixel combination with the smallest absolute difference values as the corresponding pixels.

* * * * *